(12) United States Patent
Maezawa et al.

(10) Patent No.: US 6,483,122 B1
(45) Date of Patent: Nov. 19, 2002

(54) RADIATION IMAGE CONVERSION PANEL AND STIMULABLE PHOSPHOR

(75) Inventors: Akihiro Maezawa, Tokyo (JP); Yasushi Nakano, Tokyo (JP)

(73) Assignee: Konica Corporation, Tokyo (JP)

( * ) Notice: Subject to any disclaimer, the term of this patent is extended or adjusted under 35 U.S.C. 154(b) by 96 days.

(21) Appl. No.: 09/671,693

(22) Filed: Sep. 28, 2000

(30) Foreign Application Priority Data

Sep. 29, 1999 (JP) .......................................... 11-276602

(51) Int. Cl.[7] .......................... C09K 11/61; G03B 42/08
(52) U.S. Cl. ...................... 250/582; 250/581; 250/583; 250/584; 250/484.4
(58) Field of Search .............................. 250/581, 582, 250/583, 584, 484.4

(56) References Cited

U.S. PATENT DOCUMENTS

| | | | | |
|---|---|---|---|---|
| 5,391,884 A | * | 2/1995 | Sieber et al. ............ 250/484.4 |
| 5,714,764 A | * | 2/1998 | Takeo et al. ................. 250/587 |
| 5,889,283 A | * | 3/1999 | Yanagita et al. ......... 250/484.2 |
| 5,952,666 A | * | 9/1999 | Nakano et al. .......... 250/484.4 |

FOREIGN PATENT DOCUMENTS

| | | |
|---|---|---|
| EP | 0 446 588 A1 | 9/1991 |
| EP | 0 533 234 A1 | 3/1993 |
| EP | 0 627 744 A2 | 12/1994 |

\* cited by examiner

*Primary Examiner*—Constantine Hannaher
*Assistant Examiner*—Timothy Moran
(74) *Attorney, Agent, or Firm*—Frishauf, Holtz, Goodman & Chick, P.C.

(57) ABSTRACT

A radiation image conversion panel superior in luminance and sharpness is disclosed, comprising a support having thereon a stimulable phosphor layer containing a stimulable phosphor and a protective layer, wherein the stimulable phosphor layer exhibits a density of not less than 3.00 g/cm$^3$, the stimulable phosphor layer being provided between the support and the protective layer.

18 Claims, 1 Drawing Sheet

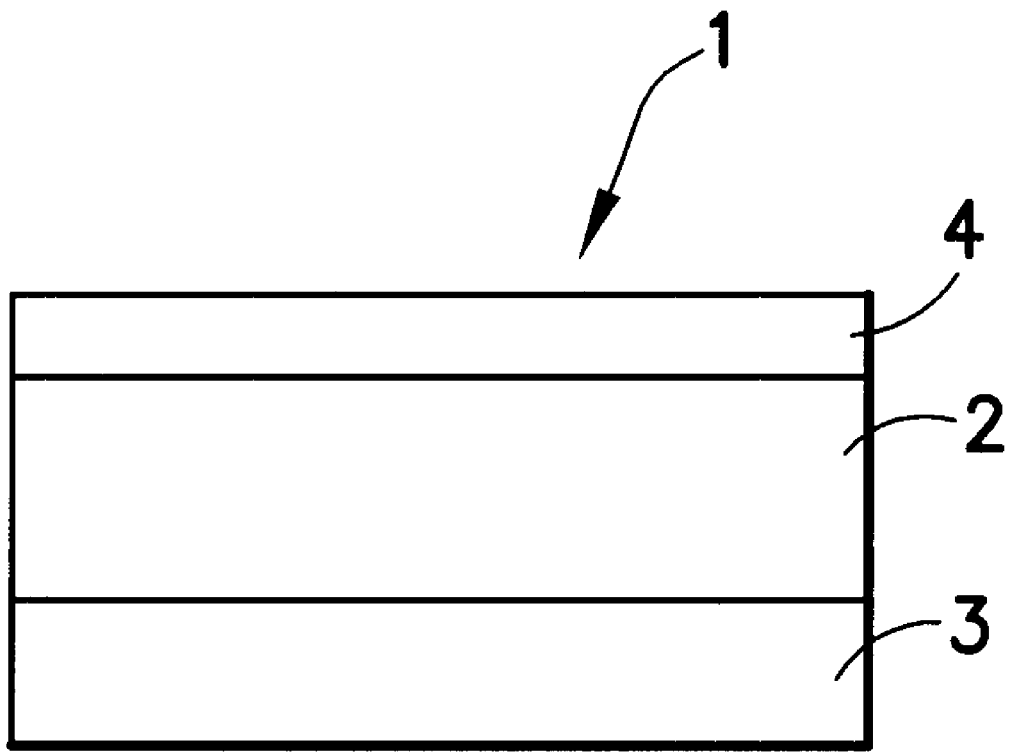

RADIATION IMAGE CONVERSION PANEL AND STIMULABLE PHOSPHOR

FIELD OF THE INVENTION

The present invention relates to radiation image conversion panels and stimulable phosphors, and in particular to radiation image conversion panels and stimulable phosphors exhibiting superior luminance and sharpness.

BACKGROUND OF THE INVENTION

As an effective means for replacing conventional radiography is known a recording and reproducing method of radiation images using stimulable phosphors described in JP-A No. 55-12148 (hereinafter, the term, JP-A refers to an unexamined and published Japanese Patent Application).

In the method, a radiation image conversion panel (hereinafter, also simply denoted as panel) comprising a stimulable phosphor is employed, and the method comprises the steps of causing the stimulable phosphor of the panel to absorb radiation having passed through an object or having radiated from an object, sequentially exciting the stimulable phosphor with an electromagnetic wave such as visible light or infrared rays (hereinafter referred to as "stimulating rays") to release the radiation energy stored in the phosphor as light emission (stimulated emission), photoelectrically detecting the emitted light to obtain electrical signals, and reproducing the radiation image of the object as a visible image from the electrical signals. The panel having been read out is subjected to image-erasing and prepared for the next photographing cycle. Thus, the radiation image conversion panel can be used repeatedly.

In the radiation image recording and reproducing methods described above, a radiation image is advantageously obtained with a sufficient amount of information by applying radiation to an object at a considerably smaller dose, as compared to conventional radiography employing a combination of a radiographic film and a radiographic intensifying screen. Further, in the conventional radiography, the radiographic film is consumed for every photographing; on the other-hand, in this radiation image converting method, in which the radiation image conversion panel is employed repeatedly, is also advantageous in terms of conservation of resources and economic efficiency.

The radiation image conversion panel (1) employed in the radiation image recording and reproducing method basically comprises a support (3) and provided thereon a phosphor layer (stimulable phosphor layer) (2), provided that, in cases where the phosphor layer is self-supporting, the support is not necessarily required. The stimulable phosphor layer comprises a stimulable phosphor dispersed in a binder. There is also known a stimulable phosphor layer, which is formed by vacuum evaporation or a sintering process, free from a binder, and which comprises an aggregated stimulable phosphor. There is further known a radiation image conversion panel in which a polymeric material is contained in the openings among the aggregated stimulable phosphor. On the surface of the stimulable phosphor layer (i.e., the surface which is not in contact with the support) is conventionally provided a protective layer (4) comprising a polymeric film or an evaporated inorganic membrane to protect the phosphor layer from chemical deterioration and physical shock.

The stimulable phosphor, after being exposed to radiation, produces stimulated emission upon exposure to the stimulating ray. In practical use, phosphors are employed, which exhibit an emission within a wavelength region of 300 to 500 nm stimulated by stimulating light of wavelengths of 400 to 900 nm. Examples of such stimulable phosphors include rare earth activated alkaline earth metal fluorohalide phosphors described in JP-A Nos. 55-12145, 55-160078, 56-74175, 56-116777, 57-23673, 57-23675, 58-206678, 59-27289, 59-27980, 59-56479 and 59-56480; bivalent europium activated alkaline earth metal fluorohalide phosphors described in JP-A Nos. 59-75200, 6-84381, 60-106752, 60-166379, 60-221483, 60-228592, 60-228593, 61-23679, 61-120882, 61-120883, 61-120885, 61-235486 and 61-235487; rare earth element activated oxyhalide phosphors described in JP-A 59-12144; cerium activated trivalent metal oxyhalide phosphors described in JP-A No. 55-69281; bismuth activated alkaline metal halide phosphors described in JP-A No. 60-70484; bivalent europium activated alkaline earth metal halophosphate phosphors described in JP-A Nos. 60-141783 and 60-157100; bivalent europium activated alkaline earth metal haloborate phosphors described in JP-A No. 60-157099; bivalent europium activated alkaline earth metal hydrogenated halide phosphors described in JP-A 60-217354; cerium activated rare earth complex halide phosphors described in JP-A Nos. 61-21173 and 61-21182; cerium activated rare earth halophosphate phosphors described in JP-A No. 61-40390; bivalent europium activated cesium rubidium halide phosphors described in JP-A No. 60-78151; bivalent europium activated cerium halide rubidium phosphors described in JP-A No. 60-78151; bivalent europium activated halogen phosphors described in JP-A No. 60-78153; and tetradecahedral rare earth metal activated alkaline earth metal fluorohalide phosphors which are precipitated from liquid phase, as described in JP-A No. 7-233369.

However, sufficient performance has not been achieved with respect to sharpness and luminance. Specifically in mammography, in order to photograph a mamma comprised of tissues such as a mammary gland, interstitial tissue, fat, blood vessel and skin, which are close in their X-ray absorption coefficient, it is necessary to increase the difference in their X-ray absorption to form a clearer image. To increse the X-ray absorption difference, it is necessary to make X-ray quality more easily absorbable into the organic material to conduct photographing and for that purpose, photographing is conducted using X-rays of a lower tube voltage (i.e., the lower the X-ray tube voltage, the larger difference in X-ray absorption). Conventional chest radiography is generally conducted at a tube voltage of 80 to 140 kV. On the contrary, mammography is conducted using X-rays at a tube voltage of 25 to 32 kV, which are more easily absorbed by the stimulable phosphor. However, emission of the radiation image conversion panel exhibits a characteristic that X-rays of a higher tube voltage result in higher luminance and therefore X-rays of lower tube voltage provide lower luminance. As a result, in mammography of a low tube voltage, X-rays cannot reach the bottom of the plate so that the surface emission mainly plays a role.

SUMMARY OF THE INVENTION

Accordingly, it is an object of the present invention to provide a radiation image conversion panel having a stimulable phosphor layer and a stimulable phosphor exhibiting superior luminance and sharpness even in X-ray radiography at a low tube voltage.

The object of the invention can be accomplished by the following constitution:

1. A radiation image conversion panel comprising a support having thereon a stimulable phosphor layer containing a stimulable phosphor and a protective layer, wherein the stimulable phosphor layer exhibits a density of not less than 3.00 g/cm³, the stimulable phosphor layer being provided between the support and the protective layer;

2. The radiation image conversion panel described in 1, wherein the stimulable phosphor layer has a thickness of less than 200 μm;
3. The radiation image conversion panel described in 1, wherein the stimulable phosphor layer exhibits a density of not less than 3.12 g/cm³;
4. The radiation image conversion panel described in 1, wherein the stimulable phosphor is represented by the following formula (1):

  formula (1)

wherein $M^2$ is at least an alkaline earth metal selected from the group consisting of Mg, Ca, Sr, Zn and Cd; X is at least a halogen selected from the group consisting of Cl, Br and I; x and y are the number meeting the following requirement:

$0 \leq x \leq 0.6$ and $0 < y \leq 0.2$;

5. The radiation image conversion panel described in 4, wherein in formula (1), X is I;
6. The radiation image conversion panel described in 5, wherein the stimulable phosphor is prepared using an aqueous barium iodide solution as a raw material, the aqueous barium iodide solution containing barium iodide of not less than 3 mol/l;
7. The radiation image conversion panel described in 6, wherein the stimulable phosphor exhibits a density of not less than 5.45 g/cm³;
8. The radiation image conversion panel described in 7, wherein the stimulable phosphor exhibits a density of not less than 5.80 g/cm³;
9. The radiation image conversion panel described in 1, wherein the stimulable phosphor layer exhibits a filling factor of not less than 60%;
10. The radiation image conversion panel described in 1, wherein the stimulable phosphor has an average particle size of not more than 5 μm;
11. The radiation image conversion panel described in 1, wherein the stimulable phosphor layer contains a binder, the binder being comprised of a sulfonic acid group containing polyester resin or a sulfonic acid group containing polyurethane resin;
12. A stimulable phosphor exhibiting a density of not less than 5.45 g/cm³;
13. The stimulable phosphor described in 12, wherein the stimulable phosphor exhibits a density of not less than 5.80 g/cm³;
14. The stimulable phosphor described in 12, where the stimulable phosphor is represented by the following formula (1):

  formula (1)

wherein $M^2$ is at least an alkaline earth metal selected from the group consisting of Mg, Ca, Sr, Zn and Cd; X is at least a halogen selected from the group consisting of Cl, Br and I; x and y are the number meeting the following requirement:

$0 \leq x \leq 0.6$ and $0 < y \leq 0.2$;

15. The stimulable phosphor described in 14, wherein in formula (1), X is I;
16. The stimulable phosphor of claim 15, wherein the stimulable phosphor is prepared using an aqueous barium iodide solution as a raw material, the aqueous barium iodide solution containing barium iodide of not less than 3 mol/l;
17. The stimulable phosphor described in 12, wherein the stimulable phosphor has an average particle size of not more than 5 μm;
18. A radiographic image forming method comprising the step of:
    (a) exposing a radiation image conversion panel to radiation through an object,
    wherein the radiation image conversion panel comprises a support having thereon a stimulable phosphor layer containing a stimulable phosphor and a protective layer, the stimulable phosphor layer exhibiting a density of not less than 3.00 g/cm³ and the stimulable phosphor layer being provided between the support and the protective layer;
19. The radiographic image forming method described in 18, wherein in step (a), the radiation image conversion panel stores a mammographic image;
20. The radiographic image forming method described in 18, wherein in step (a), the radiation image conversion panel is exposed to a radiation at a tube voltage of not more than 30 kV.

Preferred embodiment of the present invention include:
(1) A radiation image conversion panel comprising a support having thereon a stimulable phosphor layer containing a stimulable phosphor and a protective layer, wherein the stimulable phosphor layer exhibits a density of not less than 3.00 g/cm³;
(2) The radiation image conversion panel described in 1, wherein the stimulable phosphor layer exhibits a density of not less than 3.12 g/cm³;
(3) The radiation image conversion panel described in 1 or 2, wherein the stimulable phosphor is represented by the following formula (1):

  formula (1)

wherein $M^2$ is at least an alkaline earth metal selected from the group consisting of Mg, Ca, Sr, Zn and Cd; X is at least a halogen selected from the group consisting of Cl, Br and I; x and y are the number meeting the following requirement:

$0 \leq x \leq 0.6$ and $0 < y \leq 0.2$;

(4) The radiation image conversion panel described in 3, wherein in formula (1), X is I;
(5) The radiation image conversion panel described in 4, wherein the stimulable phosphor is prepared using an aqueous barium iodide solution as a raw material, the aqueous barium iodide solution containing barium iodide of not less than 3 mol/l;
(6) The radiation image conversion panel described in 5, wherein the stimulable phosphor exhibits a density of not less than 5.45 g/cm³;
(7) The radiation image conversion panel described in 6, wherein the stimulable phorphor exhibits a density of not less than 5.80 g/cm³;
(8) The radiation image conversion panel described in any of 1 through 7, wherein the stimulable phosphor has an average particle size of not more than 5 μm;
(9) The radiation image conversion panel described in any of 1 through 8, wherein the stimulable phosphor layer contains a binder, the binder being a polyester resin or a polyurethane resin, each of which contains a sulfonic acid group;

(10) A stimulable phosphor exhibiting a density of not less than 5.45 g/cm$^3$;

(11) The stimulable phosphor described in 10, wherein the stimulable phosphor exhibits a density of not less than 5.80 g/cm$^3$

(12) The stimulable phosphor described in 10 or 11, where the stimulable phosphor is represented by the following formula (1):

$$(Ba_{1-x} M^2{}_x)FX:yEu^{2+} \qquad \text{formula (1)}$$

wherein M$^2$ is at least an alkaline earth metal selected from the group consisting of Mg, Ca, Sr, Zn and Cd; X is at least a halogen selected from the group consisting of Cl, Br and I; x and y are the number meeting the following requirement:

$$0 \leq x \leq 0.6 \text{ and } 0 < y \leq 0.2;$$

(13) The stimulable phosphor described in any of 10 through 12, wherein in formula (1), X is I;

(14) The stimulable phosphor described in 13, wherein the stimulable phosphor is prepared using an aqueous barium iodide solution as a raw material, the aqueous barium iodide solution containing barium iodide of not less than 3 mol/l;

(15) The stimulable phosphor described in any of 10 through 14, wherein the stimulable phosphor has an average particle size of not more than 5 μm.

BRIEF DESCRIPTIONS OF THE DRAWINGS

The FIGURE schematiclly illustrates a radiatin panel (1) with a phosphor layer (2) carried on a support (3) and having a protective layer (4).

DETAILED DESCRIPTION OF THE INVENTION

Specifically, the difference in X-ray absorption among mammary tissue (such as muscle, fat and the mammary gland) is small, so that in mammography, it is preferred to employ X-rays at a low tube voltage. Images photographed at a low tube voltage exhibit a relatively high contrast, enabling enhanced diagnostic performance. In cases when the tube voltage is lowered, however, the X-ray dose absorbed by an object increases and the X-ray dose reaching the detector is decreased, reducing efficiency in obtaining information and leading to deteriorated image performance (such as graininess). There have been problems such that using a conventional detector, specific diagnosis could not be made at a tube voltage of 25 kV or less. As a result of the inventors' studies to overcome the forgoing problems, there was developed a detector whereby image performance was enhanced even at a tube voltage of 30 kV or less being effective in mammary diagnosis and an acceptable radiographic image could be formed even at a tube voltage of 24 kV.

The stimulable phosphor according to this invention exhibits a density of not less than 5.45 g/cm$^3$, and preferably not less than 5.80 g/cm$^3$. Specifically, stimulable phosphors represented by formula (1) described above are preferred. In the case of the stimulable phosphor represented by formula (1), the higher content of I (iodine) leads to the higher image density. In the case of phosphors having the same composition, the density can be increased by varying the crystal system of stimulable phosphor particles to shorten the interstitial distance (or lattice spacing). In the stimulable phosphors represented by formula (1), the density increases in the order of tabular<cubic<tetradecahedral<spherical crystal systems.

A precursor of the stimulable phosphor represented by formula (1) can be prepared through the solid phase process or liquid phase process, and the liquid phase process is preferred. Specifically, it is more preferred to prepare the stimulable phosphor precursor according to the following two types of the liquid phase synthesis method.

Preparation Method 1

The method comprises the steps of:

preparing within a reaction vessel an aqueous mother liquor containing at least 2N BaX$_2$, and preferably at least 2.7 BaX$_2$ [in which at least 6N (or at least 3 mol/l) BaX$_2$ is more preferred, thereby the average phosphor particle size being controlled to be 5 μm or less, and not more than 5 mol/l BaX$_2$ is also preferred] and a halide of Eu, provided that when "x" of the formula (1) is not zero, the mother liquor further contains a halide of M$^2$, adding an aqueous solution containing a 5N or more (preferably not less than 8N) inorganic fluoride (preferably, ammonium fluoride or alkali metal fluoride) into the mother liquor, while maintaining the mother liquor at 50° C. or more (preferably, 80° C. or more) to form a crystalline precipitate of a precursor of the rare earth activated alkaline earth metal fluorohalide stimulable phosphor, separating the crystalline precipitate of the precursor from the mother liquor, and calcining the separated precursor precipitates.

Preparation Method 2

The method comprises the steps of:

preparing within a reaction vessel an aqueous mother liquor containing at least 3N ammonium halide (preferably, at least 4N ammonium halide) a halide of Eu, provided that when "x" of the formula (1) is not zero, the mother liquor further contains a halide of M$^2$, adding continuously or intermittently an aqueous solution containing a 5N or more (preferably not less than 8N) inorganic fluoride (preferably, ammonium fluoride or alkali metal fluoride) and an aqueous BaX$_2$ solution into the mother liquor with maintaining the ratio of Ba of the former to Ba of the later, while maintaining the mother liquor at a temperature of not lower than 50° C. and lower than solubility (preferably, 80° C. or more) to form a crystalline precipitate of a precursor of the rare earth activated alkaline earth metal fluorohalide stimulable phosphor, separating the crystalline precipitate of the precursor from the mother liquor, and calcining the separated precursor precipitates.

The halide of Eu can be added at any time during the process. Thus, it may be contained in the mother liquor at the star of the addition, or it may be added simultaneously with or subsequently to the time of adding an aqueous inorganic fluoride (ammonium fluoride or alkali metal fluoride) or the time of adding an aqueous inorganic fluoride (ammonium fluoride or alkali metal fluoride) and an aqueous BaX$_2$ solution.

As solvent used in the process described above, not only water but also solvents other than water, such as alcohols and esters can be used.

The average particle size of the stimulable phosphor can be determined in the manner that at least 200 particles are selected at random from an electronmicrograph of the particles to determine the average value of sphere equivalent diameter of the particles.

Stimulable phosphor particles used in this invention are preferably monodisperse, and the distribution of particle size is preferably 20% or less, and more preferably 15% or less. The distribution of particle size refers to a standard deviation of particle size divided by an average particle size, expressed by percentage.

Besides the liquid phase process described above, phosphor precursors can also be prepared through the solid phase process. The solid phase process can be undergone by referring to the patent disclosure. The liquid phase process is referred to Japanese Patent Application No. 8-265525, col. [005] to [0059].

Thus, precursor crystalline precipitates and stimulable phosphor can be prepared as follows.

Initially, material(s) except for a fluoride compound are dissolved in an aqueous medium. Thus, $BaI_2$ and a halide of Eu (and if necessary, a halide of $M^2$) are each added into an aqueous solvent and dissolved with stirring to prepare an aqueous solution. In this case, the stimulable phosphor crystal system can be easily controlled to high density one such as cubic, tetradecahedral or spherical crystals by the use of $BaI_2$ hexahydrate. The amounts of $BaI_2$ and the aqueous solvent are pre-adjusted so as to have 2N or more of a concentration of $BaI_2$. A small amount of acid, ammonia, alcohol, water-soluble polymer or fine grained powder of water-insoluble metal oxide may be added thereto. The solution (reaction mother liquor) is maintained at 50° C.

Next, into the reaction mother liquor maintained at 50° C. with stirring, an aqueous solution of an inorganic fluoride (such as ammonium fluoride or alkali metal fluoride is introduced through a pipe provided with a pump. The aqueous solution is preferably introduced to a portion in which stirring is vigorously performed. Introduction of the fluoride aqueous solution into the reaction mother liquor results in precipitation of precursor crystals of the rare earth activated alkaline earth metal fluorohalide phosphor represented by the formula (1).

In addition thereto, methods for changing the crystal system of the stimulable phosphor includes, for example, a method in which seed crystals of $BaF_2$, etc. are formed through conversion under the high concentration of $BaI_2$, a method by the continuous concentration (i.e., by maintaining a high concentration) and a method in which the growth rate is promoted to form giant crystals.

The resulting crystals of the phosphor precursor are separated from the solution through filtration or centrifugation, washed sufficiently with liquid such as methanol and then dried. To the dried crystals of the phosphor precursor is added an anti-sintering agent such as fine alumina powder or fine silica powder, which adheres to the surface of the crystals. It is possible to save addition of the anti-sintering agent by selecting the calcination conditions.

Further, the phosphor precursor crystals are charged into a heat-resistant vessel such as a silica port, an alumina crucible or a silica crucible and then placed in the core portion of an electric furnace to be calcined, without causing the crystals to sinter. The furnace core of an electric furnace is limited to those in which the atmosphere is replaceable during calcination. Preferably employed as the furnace is a moving bed type electric furnace, such as a rotary kiln. As a calcinations atmosphere is employed a nitrogen gas atmosphere, a neutral atmosphere such as an argon gas atmosphere, a nitrogen gas atmosphere containing a small amount of hydrogen gas, a weakly reducible atmosphere such as a carbon dioxide atmosphere containing carbon monoxide, or a trace amount of oxygen-introduced atmosphere.

Thus, a rare earth activated alkaline earth metal fluorohalide stimulable phosphor can be obtained through the calcinations described above.

The rare earth activated alkaline earth metal fluorohalide type stimulable phosphors, represented by formula (1) can be prepare by the method 2 comprising the steps of:

preparing within a reaction vessel an aqueous mother liquor containing at least 3N ammonium halide (preferably, at least 4N ammonium halide) a halide of Eu, provided that when "x" of the formula (1) is not zero, the mother liquor further contains a halide of $M^2$, adding continuously or intermittently an aqueous solution containing a 5N or more (preferably not less than 8N) inorganic fluoride (preferably, ammonium fluoride or alkali metal fluoride) and an aqueous $BaX_2$ solution into the mother liquor with maintaining the ratio of Ba of the former to Ba of the later, while maintaining the mother liquor at a temperature of not lower than 50° C. and lower than solubility (preferably, 80° C. or more) to form a crystalline precipitate of a precursor of the rare earth activated alkaline earth metal fluorohalide stimulable phosphor, separating the crystalline precipitate of the precursor from the mother liquor, and calcining the separated precursor precipitates with avoiding sintering.

This method will be further explained in detail below. Initially, material(s) except for a fluoride compound are dissolved in an aqueous medium. Thus, Ammonium halide and halide of Eu (and if necessary, a halide of $M^2$) are each added into an aqueous solvent and dissolved with stirring to prepare an aqueous solution. In this case, the amounts of ammonium halide and the aqueous solvent are pre-adjusted so as to have 3N or more of a concentration of $Ba\ X_2$ ($BaBr_2$, $BaI_2$). A small amount of acid, ammonia, alcohol, water-soluble polymer or fine grained powder of water-insoluble metal oxide may be added thereto. The solution (reaction mother liquor) is maintained at 50° C.

Next, into the reaction mother liquor maintained at 50° C. with stirring, an aqueous solution of an inorganic fluoride (such as ammonium fluoride or alkaline metal fluoride) and aqueous $BaI_2$ solution are continuously or intermittently introduced through a pipe provided with a pump. The aqueous solutions are preferably introduced to a portion in which stirring is vigorously performed. The reaction is allowed to proceed so that no Ba ion is in excess during formation of phosphor crystals, resulting in precipitation of precursor crystals of the rare earth activated alkaline earth metal fluorohalide phosphor represented by the formula (1).

Similarly to the method 1, the phosphor precursor crystals are separated from the solvent, dried and calcined to obtain the rare earth activated alkaline earth metal fluorohalide stimulable phosphor.

Further, the phosphor precursor crystals obtained through the liquid phase process described in Japanese Patent Application 8-265525 are charged into a heat-resistant vessel such as a silica port, an alumina crucible or a silica crucible and then placed in the core portion of an electric furnace to be calcined. It is preferred to undergo calcination without causing the crystals to sinter, according to the method described below.

Phosphor precursors obtained through the solid phase process described in the afore-mentioned patent or the following solid mixture of
(1) $BaF_2$ 1 mol (Extra grade, product by Kanto Kagaku)
(2) $BaI_2$ 1 mol (Extra grade, product by Kanto Kagaku)
(3) $EuF_3$ 1/1000 mol (product by Furuuchi Chemicals) may be mixed in an automatic mortar and subjected to calcination. To achieve homogeneously mixing, they may be dissolved in water, dehydrated, dried and mixed in a crucible and thereafter subjected to calcinations.

Calcination (Heating) Process

The crystals are-calcined at a temperature between 600 and 1100° C. and preferably between 600 and 1000° C. The calcination time is dependent on the charging amount of the raw material mixture of the phosphor, the calcination temperature and the temperature at the time of removing from the furnace, and preferably between 0.5 and 12 hrs.

Calcination is carried out in a specified atmosphere, e.g., in a neutral atmosphere such as a nitrogen gas atmosphere, an argon gas atmosphere or a nitrogen gas atmosphere containing a small amount of hydrogen gas, a weakly reducing atmosphere such as carbon dioxide atmosphere containing a small amount of carbon mono-oxide; or an atmosphere in which a small amount of oxygen is introduced. Specifically, a weakly reducing atmosphere is preferred.

Calcination Apparatus

A heat source such as conventional electric furnaces and burner furnaces are employed. Examples of the apparatus for providing vibration or fluidization to the powder include:

1) moving the center of gravity of the powder sample in a dish or a boat within an electric furnace and providing it with a stirrer or a shaker;
2) moving the center of gravity of the powder sample in a dish or a boat by blowing a gas onto or into the sample; and
3) using a rotary electric furnace (rotary kiln), for example, a reaction vessel with rotary or semi-rotary reciprocation within an electric furnace to stir and mix the powder. The above methods 1) to 3) can be employed alone or in combination.

The rotary electric furnace can be employed, for example, under the following conditions:

rotation speed; 1–50 rpm, preferably 1–20 rpm, reaction vessel; quartz or SUS (stainless steal), and a rotary blade for stirring may be provided therein. Beads (quartz or ceramics) or balls with a diameter of 5 to 30 mm may concurrently be present therein for the purpose of stirring and mixing, and thereby excessive sintering can be prevented. The reason for providing vibration or fluidization of the powder during calcination is that if powder particles are stirred during calcination, heat and atmospheric gas such as a reducing gas can sufficiently and uniformly reach the interior of the particles, leading to complete calcination within a short time. It is also advantageously effective for the structure of the phosphor, elimination of an element and prevention of excessive sintering. According to the above-described calcination process, the objective stimulable phosphor can be obtained.

Of the stimulable phosphors, a bivalent europium-activated alkaline earth metal fluorohalide phosphor, an iodide containing bivalent europium activated alkaline earth metal fluorohalide phosphor, an iodide containing rare earth activated rare earth oxyhalide phosphor, and an iodide containing bismuth activated alkaline metal halide phosphor exhibit stimulated emission with a high intensity. Panel preparation, stimulable phosphor layer, coating process, support and protective layer:

The stimulable phosphor layer of the radiation image conversion panel according to this invention exhibits a density of not less than 3.00 g/cm$^3$ (in this case, preferably 3.00 to 6.00 g/cm$^3$) and more preferably not less than 3.12 g/cm$^3$ (in this case, still more preferably 3.12 to 5.00 g/cm$^3$). To increase the density of the stimulable phosphor layer, it is preferred to raise the filling factor of the stimulable phosphor [i.e., (stimulable phosphor volume)/(volume of stimulable phosphor layer)×100%]. The filling factor of the stimulable phosphor in the stimulable phosphor layer is preferably not less than 60%, and more preferably not less than 65%; and the upper limit of the filling factor is preferably less than 100%, and more preferably less than 85%. Further, the density of the stimulable phosphor layer can be raised by the use of a high density stimulable phosphor. The thickness of the stimulable phosphor layer is preferably less than 200 $\mu$m, and more preferably less than 100 $\mu$m. To raise the filling factor of the stimulable phosphor in the stimulable phosphor layer, it is preferred to use stimulable phosphors having a particle size of 5 $\mu$m or less (more preferably 3 $\mu$m or less, and still more preferably 2 $\mu$m or less; and the lower limit thereof is not less than 0.01 $\mu$m, and more preferably not less than 0.05 $\mu$m), to use a stimulable phosphor crystal system having a high filling factor (i.e., the filling factor increases in the order of tabular<cubic<tetradecahedral<spherical crystal system, or to select a binder in which the stimulable phosphor is highly dispersable.

As supports used in the radiation image conversion panel according to the invention are employed a various types of polymeric material, glass and metals. Materials which can be converted to a flexible sheet or web are particularly preferred in handling as a information recording material, From this point, there are preferred plastic resin films such as cellulose acetate films, polyester films, polyamide films, polyimide films, triacetate films or polycarbonate films; metal sheets such as aluminum, iron, copper or chromium; or metal sheets having a said metal oxide covering layer.

A thickness of the support depends on properties of the material, and is generally 80 to 1000 $\mu$m and preferably 80 to 500 $\mu$m in terms of handling. The surface of the support may be glossy or may be matte for the purpose of enhancing adhesiveness to a stimulable phosphor layer. The support may be provided with a subbing layer under the stimulable phosphor layer for the purpose of enhancing adhesiveness to the phosphor layer.

Examples of binders used in the stimulable phosphor layer according to the invention include proteins such as gelatin, polysaccharide such as dextran, natural polymeric materials such as arabic gum and synthetic polymeric materials such as polyvinyl butyral, polyvinyl acetate, nitrocellulose, ethylcellulose, vinylidene chloride/vinyl chloride copolymer, polyalkyl (metha)acrylate, vinyl chloride/vinylacetate copolymer, polyurethane, cellulose acetate butyrate, polyvinyl alcohol and linear polyester. of these binders are preferred nitrocellulose, linear polyester, polyalkyl (metha)acrylate, a mixture of nitrocellulose and linear polyester, a mixture of nitrocellulose and polyalkyl (metha)acrylate and a mixture of polyurethane and polyvinyl butyral. The binder may be cured with a cross-linking agent. Specifically, a polyester resin containing a sulfonic acid group and a polyurethane resin containing a sulfonic acid group are preferably employed as a binder capable of enhancing dispersibility or a filling factor of the stimulable phosphor.

The stimulable phosphor layer can be coated on a subbing layer, for example, according to the following manner. Thus, an iodide-containing stimulable phosphor, a compound such a phosphite ester for preventing yellow stain and binder are added into an optimal solvent to prepare a coating solution in which phosphor particles and particles of the compound (s) are uniformly dispersed in a binder solution.

In this invention, film-making binders used in the conventional layer constitution are usable as a binder in this invention, including proteins such as gelatin, polysaccharides such as dextrin or Arabic gum, polyvinyl butyral, polyvinyl acetate, nitrocellulose, ethyl cellulose, vinylidene chloride/vinyl chloride copolymer, polymethyl methacrylate, vinyl chloride/vinyl acetate copolymer, polyurethane, cellulose acetate butylate, and polyvinyl alcohol. The binder is employed in an amount of 0.01 to 1 part by weight per 1 part by weight of the stimulable phosphor. A smaller amount of the binder is preferred in terms of sensitivity and sharpness of the radiation image conversion panel and a range of 0.03 to 0.2 parts by weight is preferred in terms of easiness of coating.

A ratio of the binder to the stimulable phosphor (with the proviso that in the case of all of the binder being an epoxy group-containing compound, the ratio is that of the compound to the phosphor) depends on characteristics of the objective radiation image conversion panel, the kind of the phosphor and an addition amount of the epoxy group-containing compound. Examples of solvents used for preparing the coating solution include lower alcohols such as methanol, ethanol, 1-propanol, 2-propanol, and n-butanol; chlorine-containing hydrocarbons such as methylene chloride and ethylene chloride; ketones such as acetone, methyl ethyl ketone, methyl isobutyl ketone; esters of a lower fatty acid and lower alcohol such as methyl acetate, ethyl acetate and butyl acetate; ethers such as dioxane, ethylene glycol ethyl ether and ethylene glycol monomethyl ether; toluene; and a mixture thereof. The less solvent used in a coating solution is preferred to enhance the density of the stimulable phosphor layer. Thus, the solvent amount in the solution is preferably 25 wt % or less, and more preferably 20wt % or less. Further, high boiling solvents such as cyclohexane are preferably used as a solvent for the coating solution to conduct slow drying to form a high density layer. In this case, the high boiling solvent is preferably 40 wt % or more, and more preferably 50 wt % or more, based on the total solvent.

There may be incorporated, in the coating solution, a variety of additives, such as a dispersing agent for improving dispersibility of the phosphor in the coating solution and a plasticizer for enhancing bonding strength between the binder and phosphor. Examples of the dispersing agent include phthalic acid, stearic acid, caproic acid and oleophilic surfactants. Examples of the plasticizer include phosphate esters such as triphenyl phosphate, tricresyl phosphate and diphenyl phosphate; phthalate esters such as diethyl phthalate, dimethoxyethyl phthalate; glycolic acid esters such as ethylphthalyethyl glycolate and dimethoxyethyl glycolate; and polyesters of polyethylene glycol and aliphatic dibasic acid such as polyester of triethylene glycol and adipinic acid, and polyester of diethylene glycol and succinic acid.

There may be incorporated, in a coating solution of the stimulable phosphor layer, stearic acid, phthalic acid, caproic acid and oleophilic surfactants for the purpose of improving dispersibility of the stimulable phosphor particles. The plasticizer may optionally incorporated. Examples of the plasticizer include phthalate esters such as diethyl phthalate and dibutyl phthalate; aliphatic dibasic acid esters such as diisodecyl succinate and dioctyl adipinate; and-glycolic acid eaters such as ethylphthalylethyl glycolate and butylphthalylbutyl glycolate.

The coating solution as prepared above was uniformly coated on the surface of the subbing layer to form a coating layer. Coating can be carried out by conventional coating means, such as doctor blade, roll coater and knife coater. Subsequently, the coated layer is gradually dried to complete formation of the stimulable phosphor layer on the subbing layer. The thickness (i.e., thickness after being dried) of the stimulable phosphor layer, depending of characteristics of the radiation image conversion panel, the kind of stimulable phosphors and the mixing ratio of a binder to phosphor, is usually 10 $\mu$m to 1 mm. Specifically, in cases where used in mammography, the layer thickness is preferably 200 $\mu$m or less, and more preferably 100 $\mu$m or less to enhance the filling factor. The coating solution of the stimulable phosphor layer can be prepared by using a dispersing apparatus, such as a ball mill, sand mill, atriter, three-roll mill, high-speed impeller, Kady mill and ultrasonic homogenizer. The prepared coating solution is coated on a support by using a doctor blade, roll coater or knife coater and dried to form the stimulable phosphor layer. After the above coating solution may be coated on a protective layer and dried, the stimulable phosphor layer may be adhered to the support.

EXAMPLES

The present invention will be further explained based on examples but embodiments of the invention are not limited to these examples.

Example 1

Preparation of BaFI:Eu$^{2+}$

Barium iodide dihydrate or barium iodide hexahydrate was dissolved to form an aqueous solution having a concentration as shown in Table 1. To this aqueous solution, $2\times10^{-3}$ mole of europium iodide was added and dissolved, while the temperature was maintained at 80° C. Further thereto, 200 ml of aqueous 5 mol/l NH$_4$F solution was added at a rate of 10 ml/min to form a precipitate of BaFI:Eu$^{2+}$ precursor.

The precursor was ripened at 80° C. for 1 hr. and then subjected to suction filtration using a 1 $\mu$m membrane filter. After filtering, the precipitate was washed with ethanol to obtain BaFI:Eu$^{2+}$ precursor. The thus obtained BaFI:Eu$^{2+}$ precursor was dried in an oven at 80° C. for 2 hrs. and then heated in an atmosphere of H$_2$—N$_2$ mixture gas in an electric furnace at 850° C. for 3 hrs. to prepare a stimulable phosphor of BaFI:Eu$^{2+}$. Stimulable phosphors of Sample 1 and 2 and Comparative Samples 1 through 3 were each comprised of tabular crystals. Stimulable phosphors of Samples 3 to 6 were each comprised of substantially cubic crystals. It was proved from X-ray diffractometry that the interstitial distance of the stimulable phosphor of Sample 6 was shorter by 3% than that of Sample 3. The average particle size of each stimulable phosphor is shown in Table 1. Stimulable phosphors of Samples 3 through 6 were each at a relatively low level in sintering and at 50% thereof passed through a 50 $\mu$m$^2$ sieve, compared to those of Samples 1 and 2 and Comparative Sample 1 through 3.

Determination of Density of Stimulable Phosphor

A prescribed amount of powder was put into a pycnometer and further thereto, carbon tetrachloride was added. After being subjected to ultrasonic degassing and then to degassing under reduced pressure, the weight was measured (pycnometer method).

Preparation of Radiation Image Conversion Panel

Using each of the obtained stimulable phosphors BaFI:Eu$^{2+}$, a coating solution containing a stimulable phosphor and polyester resin (85:15 by volume percentage and 80% solid by weight) was prepared and coated on polyethylene terephthalate film using a knife coater. After drying each coat was cut to an appropriate size and melt-sealed using 50 $\mu$m GLEE (available from TOPPAN Co., Ltd.) to obtain radiation image conversion panel Samples 1 through 6 and Comparative Samples 1 through 3.

Determination of Density of Stimulable Phosphor Layer

A given area was cut out of each of the prepared radiation image conversion panels and the thickness of the stimulable phosphor layer was measured to determine the volume thereof. The thus cut-out samples were immersed in a solvent to allow the stimulable phosphor layer to swell and the stimulable phosphor layer was peeled off from the panel, then, dried and the weight thereof was measured. The density of the stimulable phosphor layer was determined from the obtained volume and weight of the layer.

Evaluation of Radiation Image Conversion Panel Luminance

The radiation image conversion panels, each was exposed to X-rays at a tube voltage of 80 KVp and then excited by scanning with a 200 mW semi-conductor laser (780 nm). Then, the stimulated emission emitted from the phosphor layer was captured by a photomultiplier R1305(available from Hamamatsu PhotOnics Co., Ltd.) to measure the intensity of the emission. The intensity was represented by a relative value, based on the intensity of Sample 1 being 1.00.

Sharpness

The radiation image conversion panels, each was exposed to X-rays at a tube voltage of 80 KVp through a rectangular wave chart used for MTF measurement (available from Konica Medical Co., Ltd.) and then excited by scanning with a 200 mW semi-conductor laser (780 nm). Then, the stimulated emission emitted from the phosphor layer was captured by a detector to convert electric signals, subjected to analog-digital conversion and recorded on a magnetic tape. The x-ray images recorded on the magnetic tape were analyzed by a computer and represented as the modulation transfer function (MTF). The MTF was represented by percentage at a special frequency of 2 cycles (1 p)/mm.

TABLE 1

| Sample | Raw Material | $BaI_2$ (mol/l) | Av. Particle Size (μm) | Density of Phosphor | Density of Layer | Luminance | Sharpness |
|---|---|---|---|---|---|---|---|
| 1 | $BaI_2.6H_2O$ | 4.2 | 3 | 5.47 | 3.15 | 1.00 | 193 |
| 2 | $BaI_2.6H_2O$ | 4 | 3 | 5.5 | 3.16 | 1.03 | 193 |
| 3 | $BaI_2.6H_2O$ | 3.9 | 3 | 5.6 | 3.22 | 1.08 | 194 |
| 4 | $BaI_2.6H_2O$ | 3.8 | 3 | 5.8 | 3.33 | 1.23 | 196 |
| 5 | $BaI_2.6H_2O$ | 3.6 | 3 | 5.9 | 3.39 | 1.31 | 195 |
| 6 | $BaI_2.6H_2O$ | 3.4 | 3 | 6.01 | 3.46 | 1.38 | 198 |
| 1 (Comp.) | $BaI_2.2H_2O$ | 4.25 | 3 | 4.9 | 2.82 | 0.01 | 165 |
| 2 (Comp.) | $BaI_2.2H_2O$ | 4.2 | 3 | 5 | 2.88 | 0.09 | 170 |
| 3 (Comp.) | $BaI_2.2H_2O$ | 4.1 | 2.5 | 5.1 | 2.93 | 0.19 | 172 |

As can be seen from Table 1, radiation image conversion panel samples according to this invention exhibited superior luminance and sharpness, compared to comparative samples. Such superior luminance and sharpness are suited to mammography.

Example 2

Radiation image conversion panel samples were prepared similarly to Example 1, except for the following. A phosphor was prepared by adding an aqueous $NH_4F$ solution of 90° C. to an aqueous 3.95 mol/l barium iodide solution maintained at 90° C., while adjusting an evaporation amount to keep a mother liquor concentration constant. In this case, europium iodide as an activator of $2 \times 10^{-3}$ mol per mol of Ba was added to the barium iodide mother liquor. Phosphor particles of an average size of 2 μm, 3 μm or 5 μm were obtained by adjusting a concentration of the $NH_4F$ solution to 16, 12 or 5 mol/l, respectively. A coating solution containing 97 parts by weight of the thus obtained phosphor, 3 parts by weight of a polyester resin (Biron 300, available from Toyobo Co., Ltd.) and cyclohexanone, as a solvent was prepared, in which cyclohexanone was used in an amount of 100 or 80 parts by weight in the case of a filling factor of 60% or 65%, respectively. The thus prepared coating solutions were coated on the support using a knife coater to prepare samples of a thickness, as shown in Table 2. Mammograph was taken using a Mo filter and a Mo tube only for mammographic use and a mammography apparatus (Mammolex, available from Toshiba Electric. Co., Ltd (SID=600). Read-out was made, based on Regius 150 in high definition-mode (available from Konica Corp.) to obtain images and signal values. Using the thus obtained images and signals, each sample was evaluated with respect to image quality, granularity and contrast, based on the following relationship:

$$P = \text{Granularity} \times \text{Contrast}$$

where P is an image quality parameter;

$$\text{Granularity} = 1 - \exp\{(-4/\pi) \times (\alpha/(1-\alpha)) \times (L/d \times \eta)\}$$

where α is a filling factor, L is a layer thickness, d is a particle diameter, and η is a conversion coefficient per particle and η=0.01;

$$\text{Contrast} = \exp\{(A/100) \times (L/1000) \times ((1-\alpha)/\alpha) \times \theta\}$$

where A is a tube voltage, L is a layer thickness, α is a filling factor and θ is a displacement coefficient (and in this case, θ=30).

Results are summarized in Table 2, in which P of 0.2 or more is suitable for mammography.

TABLE 2

| Sample No. | Tube Voltage (kV) | Filling factor (%) | Layer Thickness (μm) | Av. Particle Size (μm) | Granularity | Contrast | Image Quality (P) |
|---|---|---|---|---|---|---|---|
| 11 | 30 | 0.6 | 100 | 3 | 0.47109 | 0.548812 | 0.25854 |
| 12 | 30 | 0.6 | 200 | 3 | 0.72026 | 0.301194 | 0.21694 |
| 13 | 30 | 0.6 | 250 | 3 | 0.79655 | 0.22313 | 0.17774 |
| 14 | 30 | 0.65 | 100 | 3 | 0.54552 | 0.615934 | 0.33600 |
| 15 | 30 | 0.65 | 200 | 3 | 0.79345 | 0.379375 | 0.30101 |
| 16 | 30 | 0.65 | 250 | 3 | 0.86075 | 0.297739 | 0.25628 |
| 17 | 30 | 0.7 | 100 | 3 | 0.62872 | 0.679965 | 0.42751 |
| 18 | 30 | 0.7 | 200 | 3 | 0.86215 | 0.462352 | 0.39862 |
| 19 | 30 | 0.7 | 250 | 3 | 0.91601 | 0.381255 | 0.34923 |
| 20 | 28 | 0.6 | 100 | 3 | 0.47109 | 0.571209 | 0.26909 |
| 21 | 28 | 0.6 | 200 | 3 | 0.72026 | 0.32628 | 0.23501 |
| 22 | 28 | 0.6 | 250 | 3 | 0.79655 | 0.246597 | 0.19643 |
| 23 | 28 | 0.65 | 100 | 3 | 0.54552 | 0.636158 | 0.34704 |
| 24 | 28 | 0.65 | 200 | 3 | 0.79345 | 0.404698 | 0.32111 |
| 25 | 28 | 0.65 | 250 | 3 | 0.86075 | 0.322785 | 0.27784 |
| 26 | 28 | 0.7 | 100 | 3 | 0.62872 | 0.697676 | 0.43864 |
| 27 | 28 | 0.7 | 200 | 3 | 0.86215 | 0.486752 | 0.41965 |
| 28 | 28 | 0.7 | 250 | 3 | 0.91601 | 0.40657 | 0.37242 |
| 29 | 26 | 0.6 | 100 | 3 | 0.47109 | 0.594521 | 0.28007 |
| 30 | 26 | 0.6 | 200 | 3 | 0.72026 | 0.353455 | 0.25458 |
| 31 | 26 | 0.6 | 250 | 3 | 0.79655 | 0.272532 | 0.21709 |
| 32 | 26 | 0.65 | 100 | 3 | 0.54552 | 0.657047 | 0.35843 |
| 33 | 26 | 0.65 | 200 | 3 | 0.79345 | 0.431711 | 0.34254 |
| 34 | 26 | 0.65 | 250 | 3 | 0.86075 | 0.349938 | 0.30121 |
| 35 | 26 | 0.7 | 100 | 3 | 0.62872 | 0.715849 | 0.45007 |
| 36 | 26 | 0.7 | 200 | 3 | 0.86215 | 0.51244 | 0.44180 |
| 37 | 26 | 0.7 | 250 | 3 | 0.91601 | 0.433565 | 0.39715 |
| 38 | 24 | 0.6 | 100 | 3 | 0.47109 | 0.618783 | 0.29150 |
| 39 | 24 | 0.6 | 200 | 3 | 0.72026 | 0.382893 | 0.27578 |

TABLE 2-continued

| Sample No. | Tube Voltage (kV) | Filling factor (%) | Layer Thickness (μm) | Av. Particle Size (μm) | Granularity | Contrast | Image Quality (P) |
|---|---|---|---|---|---|---|---|
| 40 | 24 | 0.6 | 250 | 3 | 0.79655 | 0.301194 | 0.23992 |
| 41 | 24 | 0.65 | 100 | 3 | 0.54552 | 0.678621 | 0.37020 |
| 42 | 24 | 0.65 | 200 | 3 | 0.79345 | 0.460527 | 0.36540 |
| 43 | 24 | 0.65 | 250 | 3 | 0.86075 | 0.379375 | 0.32655 |
| 44 | 24 | 0.7 | 100 | 3 | 0.62872 | 0.734495 | 0.46179 |
| 45 | 24 | 0.7 | 200 | 3 | 0.86215 | 0.539484 | 0.46512 |
| 46 | 24 | 0.7 | 250 | 3 | 0.91601 | 0.462352 | 0.42352 |
| 47 | 24 | 0.6 | 100 | 2 | 0.61535 | 0.618783 | 0.38077 |
| 48 | 24 | 0.6 | 200 | 2 | 0.85204 | 0.382893 | 0.32624 |
| 49 | 24 | 0.6 | 250 | 2 | 0.90824 | 0.301194 | 0.27356 |
| 50 | 24 | 0.65 | 100 | 2 | 0.69361 | 0.678621 | 0.47070 |
| 51 | 24 | 0.65 | 200 | 2 | 0.90612 | 0.460527 | 0.41729 |
| 52 | 24 | 0.65 | 250 | 2 | 0.94804 | 0.379375 | 0.35966 |
| 53 | 24 | 0.7 | 100 | 2 | 0.77377 | 0.734495 | 0.56833 |
| 54 | 24 | 0.7 | 200 | 2 | 0.94882 | 0.539484 | 0.51187 |
| 55 | 24 | 0.7 | 250 | 2 | 0.97566 | 0.462352 | 0.45110 |
| 56 | 24 | 0.6 | 100 | 5 | 0.31762 | 0.618783 | 0.19654 |
| 57 | 24 | 0.6 | 200 | 5 | 0.53435 | 0.382893 | 0.20460 |
| 58 | 24 | 0.6 | 250 | 5 | 0.61535 | 0.301194 | 0.18534 |
| 59 | 24 | 0.65 | 100 | 5 | 0.37697 | 0.678621 | 0.25582 |
| 60 | 24 | 0.65 | 200 | 5 | 0.61183 | 0.460527 | 0.28176 |
| 61 | 24 | 0.65 | 250 | 5 | 0.69361 | 0.379375 | 0.26314 |
| 62 | 24 | 0.7 | 100 | 5 | 0.44815 | 0.734495 | 0.32916 |
| 63 | 24 | 0.7 | 200 | 5 | 0.69546 | 0.539484 | 0.37519 |
| 64 | 24 | 0.7 | 250 | 5 | 0.77377 | 0.462352 | 0.35775 |

What is claimed is:

1. A radiation image conversion panel comprising a support having thereon a stimulable phosphor layer containing a stimulable phosphor and a binder and a protective layer, wherein the stimulable phosphor layer exhibits a density of not less than 3.00 g/cm³, the stimulable phosphor layer being provided between the support and the protective layer, and where the stimulable phosphor is represented by the following formula (1):

$$(Ba_{1-x}M^2{}_x)FX{:}yEu^{2+} \quad \text{formula (1)}$$

wherein $M^2$ is at least an alkaline earth metal selected from the group consisting of Mg, Ca, Sr, Zn and Cd; X is at least a halogen selected from the group consisting of Cl, Br and I; x and y are the number meeting the following requirement:

$$0 \leq x \leq 0.6 \text{ and } 0 < y \leq 0.2.$$

2. The radiation image conversion panel of claim 1, wherein the stimulable phosphor layer has a thickness of less than 200 μm.

3. The radiation image conversion panel of claim 1, wherein the stimulable phosphor layer exhibits a density of not less than 3.12 g/cm³.

4. The radiation image conversion panel of claim 1, wherein in formula (1), X is I.

5. The radiation image conversion panel of claim 4, wherein the stimulable phosphor is prepared using an aqueous barium iodide solution as a raw material, the aqueous barium iodide solution containing barium iodide of not less than 3 mol/l.

6. The radiation image conversion panel of claim 5, wherein the stimulable phosphor exhibits a density of not less than 5.45 g/cm³.

7. The radiation image conversion panel of claim 6, wherein the stimulable phosphor exhibits a density of not less than 5.80 g/cm³.

8. The radiation image conversion panel of claim 1, wherein the stimulable phosphor layer exhibits a filling factor of not less than 60%.

9. The radiation image conversion panel of claim 1, wherein the stimulable phosphor has an average particle size of not more than 5 μm.

10. The radiation image conversion panel of claim 1, wherein the stimulable phosphor layer contains a binder, the binder being comprised of a polyester resin or a polyurethane resin, each of which contains a sulfonic acid group.

11. A stimulable phosphor exhibiting a density of not less than 5.45 g/cm³, where the stimulable phosphor is represented by the following formula (1):

$$(Ba_{1-x}M^2{}_x)FX{:}yEu^{2+} \quad \text{formula (1)}$$

wherein $M^2$ is at least an alkaline earth metal selected from the group consisting of Mg, Ca, Sr, Zn and Cd; X is at least a halogen selected from the group consisting of Cl, Br and I; x and y are the number meeting the following requirement:

$$0 \leq x \leq 0.6 \text{ and } 0 < y \leq 0.2.$$

12. The stimulable phosphor of claim 11, wherein the stimulable phosphor exhibits a density of not less than 5.80 g/cm³.

13. The stimulable phosphor of claim 12, wherein in formula (1), X is I.

14. The stimulable phosphor of claim 13, wherein the stimulable phosphor is prepared using an aqueous barium iodide solution as a raw material, the aqueous barium iodide solution containing barium iodide of not less than 3 mol/l.

15. The stimulable phosphor of claim 11, wherein the stimulable phosphor has an average particle size of not more than 5 μm.

16. A radiographic image forming method comprising the step of:

(a) exposing a radiation image conversion panel to radiation through an object, wherein the radiation image conversion panel comprises a support having thereon a stimulable phosphor layer containing a stimulable phosphor and a protective layer, the stimulable phosphor layer exhibiting a density of not less than 3.00 g/cm³ and the stimulable phosphor layer being provided between the support and the protective layer, and where the stimulable phosphor is represented by the following formula (1):

$$(Ba_{1-x}M^2{}_x)FX{:}yEu^{2+} \quad \text{formula (1)}$$

wherein $M^2$ is at least an alkaline earth metal selected from the group consisting of Mg, Ca, Sr, Zn and Cd; X is at least a halogen selected from the group consisting of Cl, Br and I; x and y are the number meeting the following requirement:

$$0 \leq x \leq 0.6 \text{ and } 0 < y \leq 0.2.$$

17. The radiographic image forming method of claim 16, wherein in step (a), the radiation image conversion panel stores a mammographic image of the object.

18. The radiographic image forming method of claim 16, wherein in step (a), the radiation image conversion panel is exposed to a radiation at a tube voltage of not more than 30 kV.

* * * * *